No. 681,158. Patented Aug. 20, 1901.
C. A. WANNER.
CONDUIT.
(Application filed July 6, 1901.)
(No Model.)
2 Sheets—Sheet 1.

Witnesses:-
Hamilton D. Turner
Louis M. V. Whitehead

Inventor:
Charles A. Wanner
by his Attorneys:-
Howson & Howson

THE NORRIS PETERS CO., PHOTO-LITHO., WASHINGTON, D. C.

No. 681,158. Patented Aug. 20, 1901.
C. A. WANNER.
CONDUIT.
(Application filed July 6, 1901.)
(No Model.)
2 Sheets—Sheet 2.
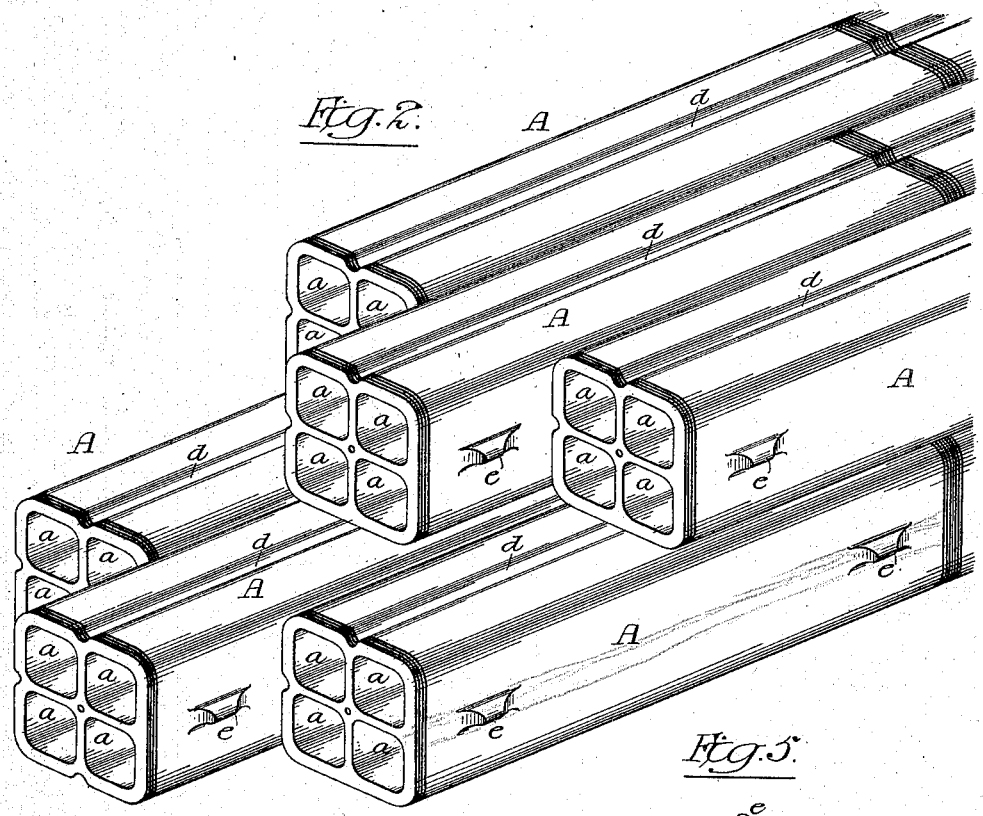
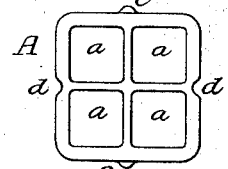
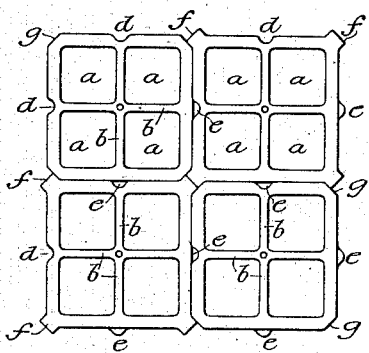
Witnesses:-
Hamilton D. Turner
Louis M. F. Whitehead
Inventor:-
Charles A. Wanner
by his Attorneys:-
Howson & Howson

UNITED STATES PATENT OFFICE.

CHARLES A. WANNER, OF PHILADELPHIA, PENNSYLVANIA.

CONDUIT.

SPECIFICATION forming part of Letters Patent No. 681,158, dated August 20, 1901.

Application filed July 6, 1901. Serial No. 67,376. (No model.)

*To all whom it may concern:*

Be it known that I, CHARLES A. WANNER, a citizen of the United States, residing in Philadelphia, Pennsylvania, have invented certain Improvements in Conduits, of which the following is a specification.

The object of my invention is to so construct a sectional conduit made of clay or other suitable material that the several sections can be readily alined and several series of sections can be assembled in line within a trench, as fully described hereinafter.

Figure 1:
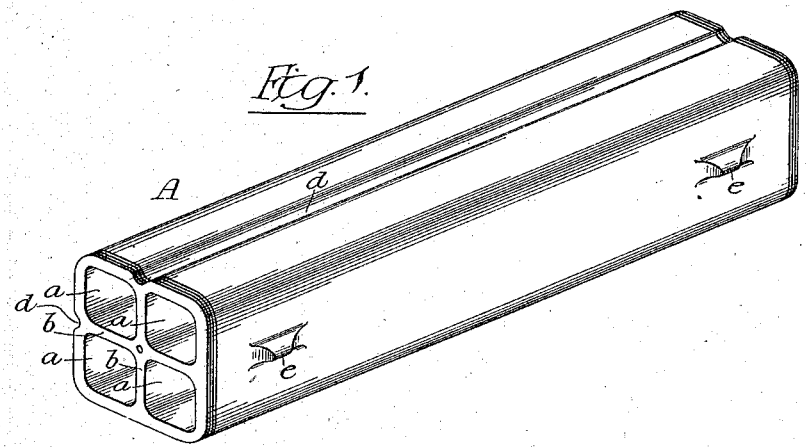
Figure 3:
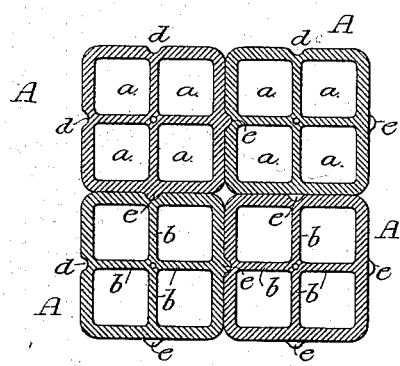
Figure 4:
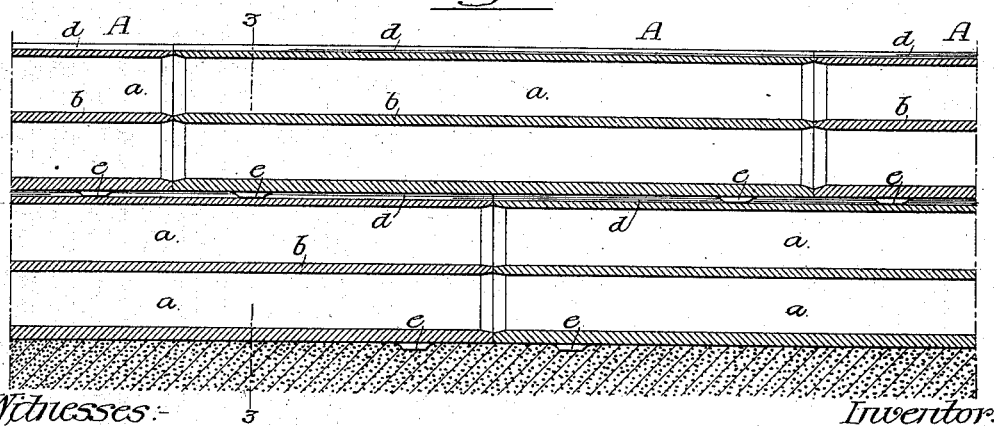

In the accompanying drawings, Figure 1 is a perspective view of a section of a conduit, illustrating my invention. Fig. 2 is a perspective view showing a series of sections assembled. Fig. 3 is a sectional view on the line 3 3, Fig. 4. Fig. 4 is a longitudinal sectional view of the conduit shown in Fig. 3, and Figs. 5, 6, and 7 are views of modifications of my invention.

A is a conduit-section made of clay and baked in the ordinary manner. In the present instance this conduit has four compartments $a$, formed by partitions $b$; but it will be understood that any number of compartments may be formed as desired.

Two sides of the conduit have longitudinal grooves $d$, preferably extending the full length of the conduit, as shown in Fig. 1, and on the other two sides of the conduit are lugs $e$. These lugs are preferably short and situated some distance from each end of the conduit-section.

When the several conduits are assembled as shown in Figs. 2, 3, and 4, the lugs of one conduit-section enter the grooves formed in the sides of the other conduit-sections, and if the sections are assembled, as shown in Fig. 2, so that the joints will be staggered, one lug of each abutting section will enter a groove of a single adjoining section near the center. By this arrangement the sections can be assembled and will readily fit whether the sections are warped during the baking or not, as it is essential that the abutting ends of the sections should be in line, so that wires passed through the conduits will not catch on the edges of the conduits, although in order to prevent the catching of the wires in passing through the conduits the ends are beveled, as shown in Fig. 4, in the ordinary manner.

In Figs. 1, 2, 3, and 4 I have shown each section having a groove on one side and lugs on the opposite side, with a groove at the top and lugs on the bottom, so that the sections can be laid one upon another, with the grooves of all the sections at the top; but the sections may be made, as shown in Fig. 5, with the lugs opposite each other.

In some instances there may be more than two lugs on the conduit, and the lugs may be of any length desired, depending greatly upon the character of the material of which the conduit is made, and in some instances a single lug may be used, if desired, and this lug can be at the point where the joint between two sections comes, so that the lug on one section will aline the ends of two abutting sections; but I prefer the construction shown in Fig. 1.

Fig. 6 is a modification of my invention in which two conduit-sections differing in shape are used, one section having longitudinal ribs or projections $f$ at the corners, and the other section having its corners beveled at $g$ for the reception of the ribs of an adjoining section.

In some instances a single conduit-section may be used, as shown in the modification Fig. 7, in which diametrically opposite corners have projecting ribs and the other corners are beveled.

Each of the modifications shown in Figs. 6 and 7 have the lugs and grooves shown in Fig. 1.

I claim as my invention—

1. A conduit having grooves on two sides and lugs on the other two sides, said lugs being shaped to enter grooves in the adjoining conduit-sections, substantially as described.

2. A conduit quadrangular in cross-section having in one side and in the top a longitudinal groove and having at the other side and at the bottom one or more lugs arranged to enter the grooves of adjoining conduits, substantially as described.

3. A conduit quadrangular in cross-section and divided into compartments, two longitudinal grooves extending the full length of the conduit on two sides and short lugs on the other two sides, one near each end, said lugs being shaped to enter the grooves of adjoining conduits, substantially as described.

4. A conduit quadrangular in cross-section having two longitudinal grooves and lugs, and having longitudinal ribs at two or more corners, the other corners being beveled, substantially as described.

In testimony whereof I have signed my name to this specification in the presence of two subscribing witnesses.

CHAS. A. WANNER.

Witnesses:
WILL. A. BARR,
JOS. H. KLEIN.